United States Patent [19]

Nelle

[11] Patent Number: 5,050,311

[45] Date of Patent: Sep. 24, 1991

[54] LENGTH OR ANGLE MEASURING APPARATUS

[75] Inventor: Guenther Nelle, Bergen, Fed. Rep. of Germany

[73] Assignee: Dr. Johannes Heidenhain GmbH, Traunreut, Fed. Rep. of Germany

[21] Appl. No.: 614,031

[22] Filed: Nov. 14, 1990

Related U.S. Application Data

[63] Continuation of Ser. No. 174,606, Mar. 29, 1988, abandoned.

[30] Foreign Application Priority Data

Apr. 2, 1987 [DE] Fed. Rep. of Germany ....... 3711070

[51] Int. Cl.⁵ .............................................. G01B 11/04
[52] U.S. Cl. ........................................ 33/704; 33/702
[58] Field of Search ................. 33/704, 706, 707, 708, 33/702, DIG. 19

[56] References Cited

U.S. PATENT DOCUMENTS

| 3,816,002 | 6/1974 | Wieg | 33/707 |
| 4,262,423 | 4/1981 | Affa | 33/707 |
| 4,593,471 | 6/1986 | Nelle | 33/125 T |

FOREIGN PATENT DOCUMENTS 2810341  1/1980  Fed. Rep. of Germany .
3106701  9/1982  Fed. Rep. of Germany .
3113962  10/1982  Fed. Rep. of Germany .
3243966  5/1984  Fed. Rep. of Germany .
2853771  8/1986  Fed. Rep. of Germany .

OTHER PUBLICATIONS

"Neuere Entwicklunger biefotoelektrischen Langenmessgeraten" by A. Ernst Messen und Prufen-/Automatik.

Primary Examiner—William A. Cuchlinski, Jr.
Assistant Examiner—C. W. Fulton
Attorney, Agent, or Firm—Willian Brinks Olds Hofer Gilson & Lione

[57] ABSTRACT

A length or angle measuring apparatus which measures the relative position of two objects comprises a scale attached to a first object to be measured and a scanning unit which has at least one scanning element connected to the second object to be measured, wherein the second object and the scanning unit have different thermal expansion coefficients. The graduation of the scale is scanning by a scanning element of the scanning unit at a scanning point. Fastening means are provided which fasten the scanning unit to the second object to be measured, such that the scanning point of the scanning element of the scanning unit has no zero point displacement with temperature changes.

29 Claims, 3 Drawing Sheets

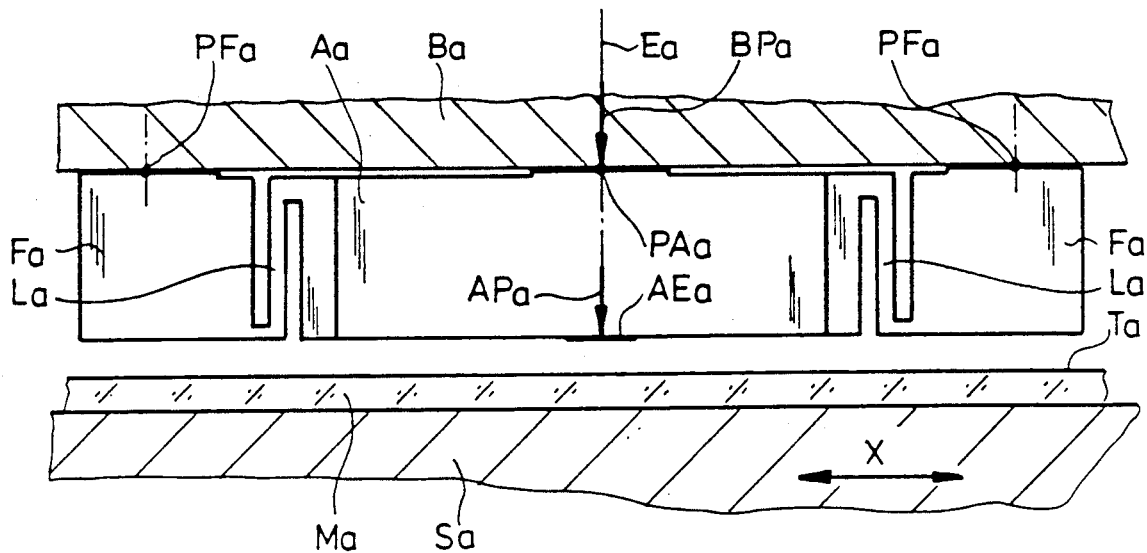
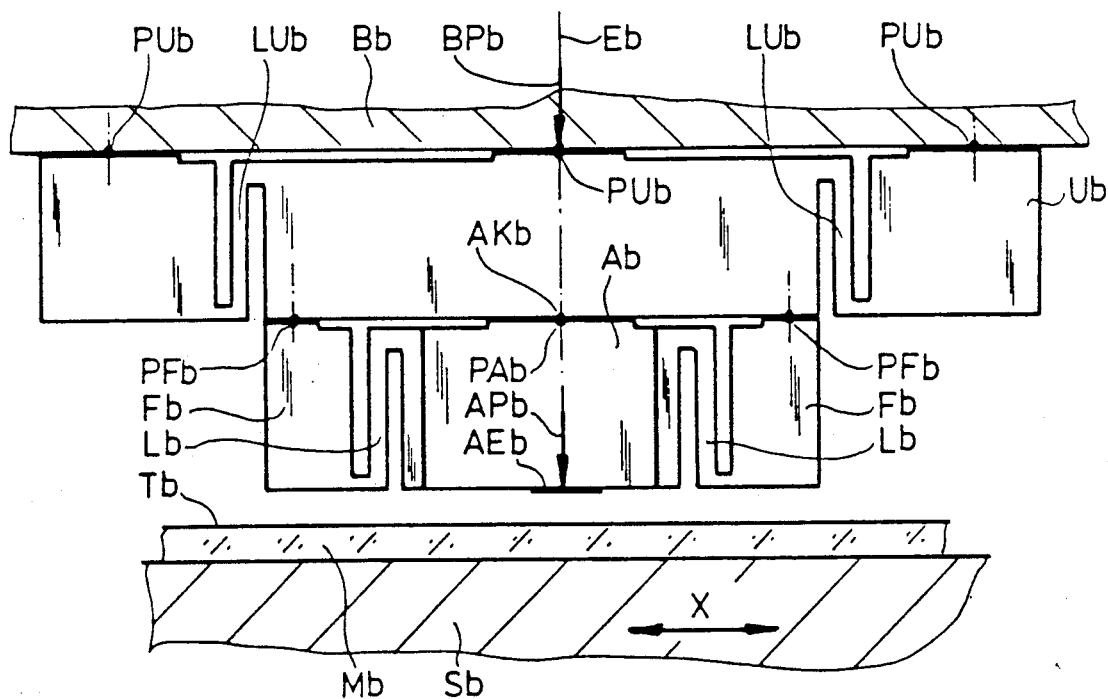

LENGTH OR ANGLE MEASURING APPARATUS

This application is a continuation of application Ser. No. 07/174,606, filed 3/29/88 now abandoned.

BACKGROUND OF THE INVENTION

The present invention relates to a length or angle measuring apparatus for measuring the relative position of two objects and, more particularly, to a length or angle measuring apparatus which utilizes a scanning unit to scan the graduation of a scale.

Length or angle measuring devices are used, particularly in processing machines to measure the relative position of a tool with respect to a workpiece to be processed, as well as in coordinate measuring machines to determine the position and/or the dimensions of test objects.

In one such length measuring arrangement, for example, a scale is connected with the one object, the graduation of which is scanned by a scanning unit connected with the other object for obtaining periodic scanning signals from which position measuring values are obtained by means of an evaluating arrangement engaged on the outlet side. The values are fed to a position display unit, which displays the values in digital form, and/or to the control arrangement of a processing machine on which the length measuring apparatus is used.

Such length measuring devices are used both as unencapsulated and also as encapsulated measuring devices.

The article "Neuere Entwicklungen bei photelektrischen Längenmess-systemen" (Recent developments in photoelectric length measuring systems) by A. Ernst in "Messen und Prüfen/Automatik", July/August 1974, discloses in FIG. 12a an unencapsulated length measuring device in which a scale is fastened to one object by means of several clamping shoes and a scanning unit is fastened to the other object by means of two screws.

German patent specification DE-OS 31 13 962 describes an encapsulated length measuring apparatus in which a scale and a scanning unit are encapsulated in a closed casing for protection against environmental influences. The scale is fastened to the first object. The scanning unit is fastened to an entrainment means, which grips through a sealed longitudinal slit of the casing and is fastened to the second object by means of two screws.

In both the aforementioned length measuring devices the scanning unit is guided, with respect to the scale, by means of the guidance of the two objects to be measured (object guidance). The guidance of the scanning unit to the scale, must occur within certain narrow limits to assure accurate scanning. Therefore, if the attached scanning unit or the entrainment means with the scanning unit is fastened to the object to be measured, very narrow attachment tolerances must be observed. German patent DE-PS 28 10 341 discloses an arrangement which permits coarser attachment tolerances despite these scanning function requirements. A scanning unit is guided on an auxiliary guide which is formed by the scale and/or the casing. The auxiliary guide is in turn connected to the object to be measured. The scanning unit is connected to an entrainment means by means of a coupling element, which is rigid in the measuring direction. The entrainment means is, in turn, fastened to one of the objects to be measured by means of two screws.

Ordinarily, in such arrangements, the scale is fastened to a sliding carriage and the scanning unit to a bed of a processing machine, which are the objects to be measured. After the scanning unit is fastened to the appertaining object to be measured, a reference point is allocated to this object. The reference point corresponds to the scanning point (scanning place) of the scanning element of the scanning unit. The scanning unit scans the graduation of the scale. For example, when a photoelectric scanning unit is used, the graduation may be a scanning graduation field. The reference point may be purely fictitious or be characterized by a mark on the object (bed) to be measured. In a normal thermal condition (for example 20° C.), the starting position of the slide carriage with respect to the bed, the graduation zero point of the scale, the scanning point of the scanning unit and the reference point of the bed all lie in a plane perpendicular to the measuring direction.

While the bed of processing machines generally consists of cast iron, aluminum is the preferred material chosen as the material for the entraining means and synthetic materials are the preferred materials chosen for the scanning unit. This choice of materials results in economical manufacture and reduced weight of the measuring device. Since these differing materials have different thermal expansion coefficients a [object: $\alpha(O) = 10 \cdot 10^{-6} K^{-1}$, entraining means:
$\alpha(M) = 21 \cdot 10^{-6} K^{-1}$ and scanning unit:
$\alpha(A) = 35 \cdot 10^{-6} K^{-1}$], relative displacements between the scanning point of the scanning unit, the reference point of the object to be measured and the graduation zero point of the scale may occur with temperature variations relative to the normal thermal condition. Such relative displacements lead to zero-point displacements of the measuring apparatus, which displacements lead to corresponding measuring errors.

For example, temperature increases relative to the normal thermal condition may result from the processing operations on the processing machine. Considerable longitudinal tensile forces in the measuring direction will occur in the scanning unit or in the entraining means because of the rigid fastening, by means of the two screws, of the scanning unit or of the entraining means on the object to be measured. These longitudinal tensile forces arise because the thermal expansion coefficient $\alpha(A)$ of the scanning unit and the thermal expansion coefficient $\alpha(M)$ of the entraining means are considerably greater than the thermal expansion coefficient $\alpha(O)$ of the object to be measured. These longitudinal tensile forces can lead to undefined relative displacements of the scanning unit or of the entraining means at the fastening points on the object. The direction and the magnitude of such relative displacements are not predictable; therefore, the associated zero-point displacement of the measuring apparatus is uncontrollable.

German patent DE-PS 28 53 771 discloses a length measuring apparatus in which a carrier for a scale is connected to an object to be measured by means of a fastening elements disposed at each end of the object. The carrier and the object consist of materials which have different thermal expansion coefficients. While a first end of the carrier for the scale is joined directly with the fastening element, a length compensation element is disposed between the second end of the carrier and the fastening element. The length compensation element provides the second end of the carrier with a translatory degree of freedom in the measuring direction. Therefore, no longitudinal forces arise in the carrier due to thermal length changes of the carrier relative to the object, which forces could act on the scale and impair the accuracy of the measurement.

German patent application DE-OS 32 43 966 teaches a length measuring apparatus in which a carrier, in the form of a casing for a scale, is connected to an object to be measured. The carrier is connected at about its midpoint by a first fastening element and at each end by further fastening elements. The carrier for the scale and the object consist of materials which have different thermal expansion coefficients. While the carrier of the scale is connected directly with the fastening element in the middle, each of the two ends of the carrier is connected to the respective element by means of a length compensation element. The length compensation elements accommodate longitudinal translation of the ends of the carrier in the measuring direction. Thus, with changes in temperature, the position of the scale remains substantially preserved, relative to the object to be measured.

German patent DE-PS 31 06 701 discloses a length measuring device for machine tools, which compensates for the thermal length changes of machine components by means of an expansion bar made of a material with a high thermal expansion coefficient. The expansion bar is fastened to a machine component at one end and to a scale at the other end. The thermal expansion of the expansion bar is equal to that of the machine component, so that the thermal expansion of the machine part is detected and compensated by the length measuring device.

Therefore, in view of the above, it is an object of the present invention to provide length or angle measuring apparatus which will exclude thermally generated relative displacements between the scanning point of the scanning unit and the appertaining reference point of the object to be measured.

It is a further object of the present invention to provide a length or angle measuring device which, with temperature changes, will eliminate relative displacement between the scanning point of the scanning unit and the appertaining reference point of the object to be measured despite different expansion coefficients of the object, the entrainment means and the scanning unit.

It is another object of the present invention to provide a length or angle measuring device which, in a simple manner, will eliminate thermally generated relative displacements between the scanning point of the scanning unit and the appertaining reference point on the object to be measured.

It is still a further object of the present invention to provide a length or angle measuring apparatus which will have greater accuracy, thereby improving the quality of workpieces and considerably lowering the rejection rate of processing machines.

Additional objects, advantages and novel features of the invention will be set forth in part in the description which follows and, in part, will become apparent to those skilled in the art upon examination of the following or may be learned by practice of the invention. The objects and advantages of the invention may be obtained by means of the instrumentalities and combinations, particularly pointed out in the appended claims.

SUMMARY OF THE INVENTION

To achieve the foregoing and other objects and in accordance with the purposes of the present invention, as embodied and broadly described herein, the length or angle measuring apparatus of the present invention, which measures the relative position of two objects, may comprise a scale attached to the first object and a scanning unit, which has at least one scanning element, connected to the second object, wherein the second object and the scanning unit have different thermal expansion coefficients. The graduation of the scale is scanned by the scanning unit. Fastening means are provided which fasten the scanning unit to the second object to be measured such that the scanning point of the scanning element of the scanning unit has no zero point displacement with temperature changes.

In a first arrangement, the fastening point of the scanning unit to the second object and the scanning point of the scanning element of the scanning unit are disposed such that both lie in a plane which is perpendicular to the measuring direction X.

In a second arrangement of the present invention, a scale is connected to a first object and a scanning unit having a scanning element, which scans the graduation of the scale, is connected to a second object by an entrainment means. The second object, the entrainment means and the scanning unit have different thermal expansion coefficients $\alpha(Bd)$, $\alpha(Ud)$, and $\alpha(Ad)$ respectively. The entrainment means is fastened to the second object at first and second fastening points. The scanning unit is fastened to the entrainment means at a first fastening point corresponding to a coupling point on the entrainment means and is further fastened at a second fastening point. The scanning element of the scanning unit is disposed between the first fastening point of the entrainment means and the coupling point of the scanning unit. A first spacing "a" is defined between the first fastening point of the entrainment means and the coupling point of the scanning unit. A second spacing "b" is defined between the coupling point of the scanning unit and the scanning point of the scanning element. The two spacings, "a" and "b", are related such that they satisfy the condition $\alpha(Ud)\cdot a = \alpha(Ad)\cdot b$. Thus, no relative displacements arise between the scanning point of the scanning unit and the appertaining reference point of the second object.

A particular advantage of the present invention is that thermally generated relative displacements are eliminated between the scanning point of the scanning unit and the appertaining reference point of the second object. Thus, no zero point displacements occur in the measuring apparatus, thereby eliminating measuring errors associated with such zero point displacements.

BRIEF DESCRIPTION OF THE DRAWINGS

FIG. 1 is a schematic representation of a length or angle measuring apparatus which incorporates a first preferred embodiment of the present invention.

FIG. 2 is a schematic representation of a length or angle measuring apparatus which incorporates a second preferred embodiment of the present invention.

DETAILED DESCRIPTION OF THE PRESENTLY PREFERRED EMBODIMENTS

Figure 3:
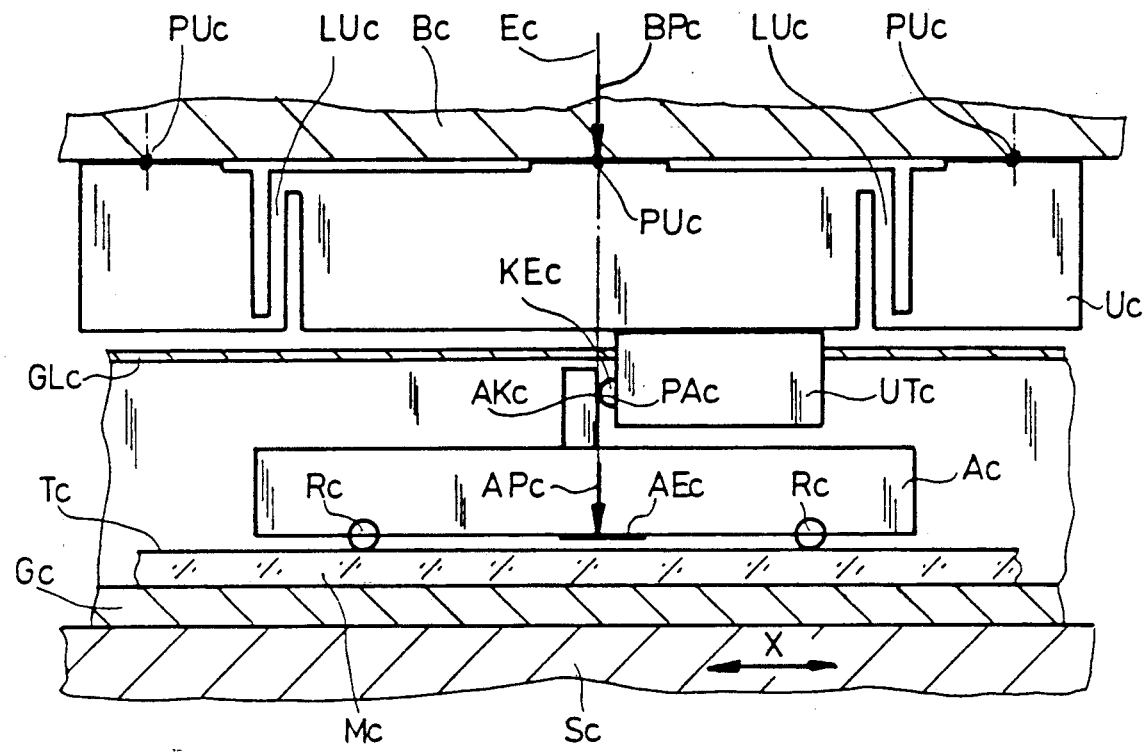
FIG. 3 is a schematic representation of a length or angle measuring apparatus which incorporates a third preferred embodiment of the present invention.

Reference will now be made to a detailed description of the preferred embodiments of the present invention, examples of which are illustrated in the accompanying drawings.

FIG. 1 illustrates a first preferred embodiment wherein a length measuring device is unencapsulated. A scale Ma is fastened to a first object Sa to be measured, such as the slide carriage of a processing machine (not shown). A scanning unit Aa is fastened, at a middle fastening point PAa, to a second object Ba to be measured, such as the bed of a processing machine. The scanning unit Aa includes at least one scanning element AEa, which scans a graduation Ta of the scale Ma thereby measuring the relative position of the two objects Sa and Ba. The scanning unit Aa is fastened at each end to the second object Ba by means of a fastening element Fa at a further fastening point PFa.

In the preferred embodiment, a pair of meander-form length compensation elements La is formed as an integral component of the fastening elements Fa. The meander-form length compensation elements are defined by a meander pattern of partially overlapping slits, each of which slits is oriented in the measuring direction X. At each end of scanning unit Aa, one of the meander-form length compensation elements La is disposed between the end of the scanning unit Aa and the further fastening points PFa. The length compensation elements La provide a coupling at the ends of scanning unit Aa which has a single translatory degree of freedom along the measuring direction X. This translatory degree of freedom will accommodate thermal expansions due to temperature changes.

The scanning point APa (scanning place) of the scanning element AEa of the scanning unit Aa and the appertaining reference point BPa of the second object Ba lie, under a normal thermal condition (for example, 20° C.), in a plane Ea, which plane Ea is perpendicular to the measuring direction X.

The second object Ba may consist, for example, of gray cast iron having a thermal expansion coefficient $\alpha(Ba)=10 \cdot 10^{-6}K^{-1}$ and the scanning unit Aa may consist, for example, of a synthetic material having a thermal expansion coefficient $\alpha(Aa)=35 \cdot 10^{-6}K^{-1}$. Since the middle fastening point PAa of the scanning unit Aa on the second object Ba also lies in the plane Ea, no relative displacements will occur between the scanning point APa of the scanning unit Aa and the appertaining reference point BPa of the second object Ba, with temperature changes relative to the normal thermal condition, despite the different expansion coefficients $\alpha(Aa)$ and $\alpha(Ba)$ of the scanning unit Aa and of the second object Ba, respectively. Thus, no zero point displacements of the measuring apparatus can occur and the corresponding measuring errors are eliminated.

It will be readily apparent that if the measuring apparatus of the present invention is used on a measuring machine in which no shocks occur relative to the processing machine, one of the fastening elements Fa or both of the fastening elements Fa, together with the length compensation elements La, may be omitted.

FIG. 2 illustrates a second preferred embodiment which incorporates the length measuring apparatus of the present invention in an unencapsulated arrangement. A scale Mb is fastened to a first object Sb to be measured, such as a sliding carriage of a processing machine (not shown). The scale Mb may be fastened in an arbitrary conventional manner, for example, by means of clamping shoes (not shown). An entrainment means Ub is fastened to a second object Bb to be measured, such as the bed of the processing machine. The entrainment means Ub is fastened to the second object at a middle fastening point PUb and on both ends at two further fastening points PUb. A pair of meander-form length compensation elements LUb are provided to accommodate thermal expansion caused by temperature changes. The meander-form length compensation elements LUb are arranged such that one is disposed on each side of the middle fastening point PUb, between the middle fastening point PUb and one of the two further fastening points PUb. The meander-form length compensation elements LUb are formed as integral components of the entrainment means Ub, and are constructed as described above. A scanning unit Ab is fastened on the entrainment means Ub at a middle fastening point PAb corresponding to a coupling point AKb on the entrainment means Ub. The scanning unit Ab scans a graduation Tb of the scale Mb with a scanning element AEb to measure the relative position of the two objects Sb and Bb. The scanning unit Ab is fastened on the entrainment means Ub at further fastening points PFb by means of a pair of fastening elements Fb, one at each end of the scanning unit Ab. A pair of meander-form length compensation elements Lb are formed as an integral component of the two fastening elements Fb. The meander-form compensation elements Lb are disposed such that each is between one of the ends of the scanning unit Ab and the further fastening point PFb. The two meander-form length compensation elements LUb of the entrainment means Ub and the two length compensation elements Lb of the scanning unit Ab provide a coupling of the two ends of the entrainment means Ub and of the two ends of the scanning unit Ab which has, in each case, a translatory degree of freedom in measuring direction X to accommodate thermal expansion due to temperature changes.

The scanning point APb (scanning place) of the scanning element AEb of the scanning unit Ab and the appertaining reference point BPb of the second object Bb lie, in a normal thermal condition (for example 20° C.) in a plane EB, which plane is perpendicular to the measuring direction X. In an exemplary embodiment, the second object Bb may consist of gray cast iron, with a thermal expansion coefficient $\alpha(Bb)=10 \cdot 10^{-6}K^{-1}$, the entrainment means Ub of aluminum, with a thermal expansion coefficient $\alpha(Ub)=21 \cdot 19^{-6}K^{-1}$ and the scanning unit Ab of synthetic material with a thermal expansion coefficient $\alpha(Ab)=35 \cdot 10^{-6}K^{-1}$. Since the middle fastening point PUb at which the entrainment means Ub is fastened to the second object Bb and the middle fastening point PAb of the scanning unit Ab and the corresponding coupling point AKb of the entrainment means Ub likewise lie in the plane Eb, no relative displacements occur between the scanning point APb of the scanning unit Ab and the appertaining reference point BPb of the second object Bb, despite temperature changes relative to a normal thermal condition. No zero point displacements will occur even in light of the differing thermal expansion coefficients $\alpha(Ab)$, $\alpha(Ub)$, $\alpha(Bb)$ of the scanning unit Ab, the entrainment means Ub and the second object Bb, respectively, thereby eliminating the corresponding measurement errors.

It will be recognized by those skilled in the art that if the measuring apparatus of the present preferred embodiment is used in a processing machine in which no relative shocks arise, one fastening element Fb or both fastening elements Fb together with the length compensation element Lb may be omitted. Similarly, one or both further fastening points PUb in the entrainment means Ub together with the length compensation element LUb may be omitted.

FIG. 3 illustrates a third preferred embodiment which incorporates the present invention in an encapsulated arrangement. A carrier Gc, such as the casing for a scale Mc, is fastened to a first object Sc to be measured, such as a sliding carriage of a processing machine (not shown). The carrier Gc may be fastened in an arbitrary conventional manner, for example by means of screws (not shown). The scale Mc is mounted on an inner surface of the casing Gc. The scale Mc is mounted by means of an adhesive layer (not represented). An entrainment means UC is fastened on a second object to be measured Bc, such as the bed of the processing machine. The entrainment means Uc is fastened at a middle fastening point PUc and at two further fastening points PUc, one on each end. Two meander-form length compensation elements LUc are formed as integral components of the entrainment means UC. The meander-form length compensation elements LUc are disposed one on each side of middle fastening point PUc, between the middle fastening point PUc and one of the two further fastening points PUc. This arrangement provides a coupling of the two ends of the entrainment means Uc which has a translatory degree of freedom in measuring direction X. A scanning unit Ac is guided by means of rolls Rc on the scale Mc and may be further guided (in a manner not shown) by means of an auxiliary guide which is independent of the guidance of the objects to be measured, Sc and Bc. The independent guide includes second rolls which engage the inner surfaces of the casing Gc. The scanning unit Ac includes a scanning element AEc which scans a graduation Tc of the scale Mc to measure the relative position of the two objects Sc and Bc. The entrainment means Uc protrudes through an oblong slit GLc sealed by sealing lips (not shown). The entrainment means Uc includes a lower part UTc, which has a cross-section similar to that of a double-edged sword, on which there is mounted a coupling element KEc. The coupling element KEc is rigid in measuring direction X, thereby providing articulate coupling of the scanning unit Ac on the entrainment means Uc at a coupling point AKc. The scanning unit Ac is biased at the coupling point AKc to the fastening point PAc by means of a spring (not shown) in constant contact with the coupling element KEc.

The scanning point APc (scanning place) of the scanning element AEc of the scanning unit Ac and the appertaining reference point BPc of the second object Bc lie, in a normal thermal condition (for example 20° C.), in a plane Ec perpendicular to the measuring direction X. AGain, in an exemplary embodiment the second object Bc may consist of gray cast iron, the entrainment means Uc of aluminum and the scanning unit Ac of a synthetic material. Since the middle fastening point PUc of the entrainment means Uc on the second object Bc and the coupling point AKc of the scanning unit Ac on the entrainment means Uc like-wise lie in the plane Ec, no relative displacements occur between the scanning point APc of the scanning unit Ac and the appertaining reference point BPc of the second object Bc, despite changes in temperatures relative to the normal thermal condition. Thus, no zero point displacements arise even in light of the differing thermal expansion coefficients of the scanning unit Ac, the entrainment means Uc and the second object Bc, thereby eliminating the corresponding measurement errors.

It will be readily apparent to those skilled in the art that if the measuring apparatus of the present preferred embodiment is used in a processing machine in which no relative shocks occur, one or both further fastening points PUc, together with the length compensation element LUc, may be omitted from the entrainment means Uc.

Figure 4:
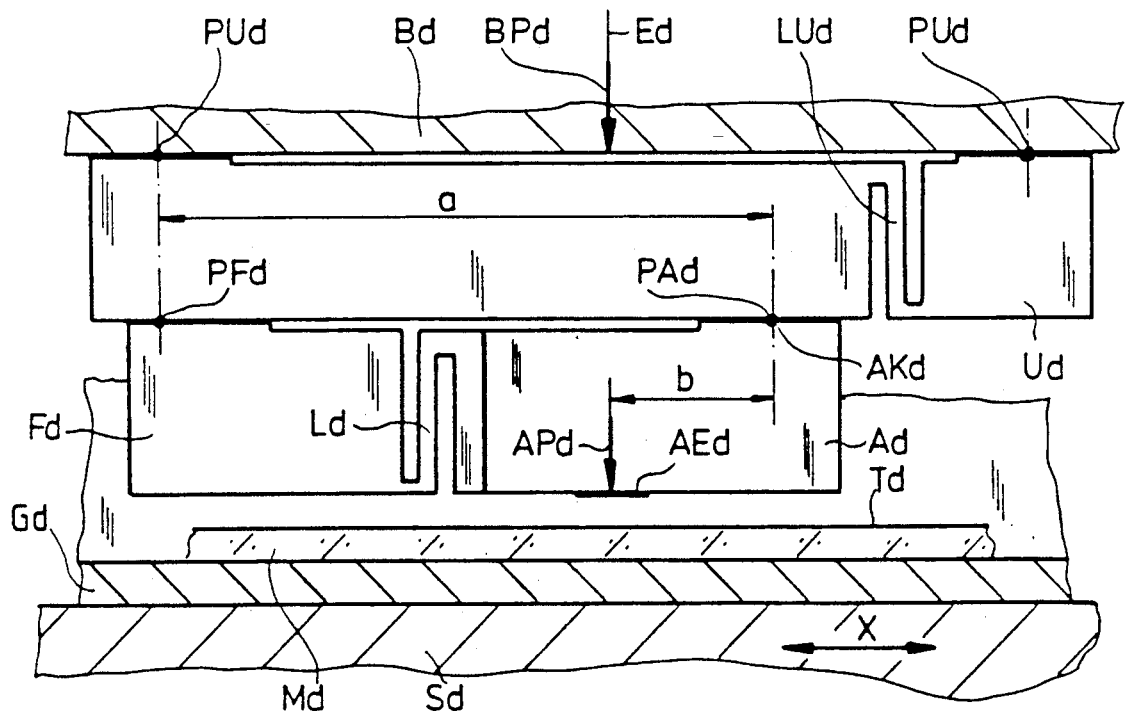
FIG. 4 is a schematic representation of a length or angle measuring apparatus which incorporates a fourth preferred embodiment of the present invention.

FIG. 4 illustrates a fourth preferred embodiment which incorporates the length measuring device of the present invention in an encapsulated arrangement. A carrier Gd, such as a casing for a scale Md, is fastened to a first object Sd to be measured, such as a sliding carriage of a processing machine (not shown). The carrier Gd may be fastened in an arbitrary conventional manner, for example by means of screws (not shown). The scale Md is mounted by means of an adhesive layer (not shown), on an inner surface of the casing Gd. An entrainment means is fastened on a second object Bd to be measured, such as the bed of the processing machine. The entrainment means Ud is fastened at the first end at a first fastening point PUd and at the second end at a second fastening point PUd. A scanning unit Ad, which includes a scanning element AEd, is fastened to the entrainment means Ud. The scanning element AEd scans a graduation Td of the scale Md to measure the relative position of the two objects Sd and Bd. The scanning unit Ad is fastened on the entrainment means Ud at a first fastening point AKd, corresponding to coupling point PAd on the entrainment means Ud. The second end of the scanning unit Ad is fastened on the entrainment means Ud at a second fastening point PFd by means of a fastening element Fd. A meander-form length compensation element Ld, formed as an integral component of the fastening element Fd, is disposed between the second end of the scanning unit Ad and the second fastening point PFd. A meander-form length compensation element LUd, formed as an integral component of the entrainment means Ud, is disposed between the coupling point AKd on the entrainment means Ud and the second coupling point Pud of the entrainment means Ud, which is connected to the second object Bd. The meander-form length compensation element Ld of the scanning unit Ad and the meander form length compensation element LUd of the entrainment means Ud provide a coupling at the second end of the scanning unit Ad and a coupling at the second end of the entrainment means Ud which have a translatory degree of freedom in measuring direction X, which accommodates for thermal expansions caused by temperature changes.

The scanning point APd (scanning place) of the scanning element AEd of the scanning unit Ad and the appertaining reference point BPd of the second object Bd lie, under normal thermal conditions (for example 20° C.), in a plane Ed, which is perpendicular to the measuring direction X. Again, in an exemplary embodiment the second object Bd may consist of gray cast iron, with a thermal expansion coefficient $\alpha(Bd) = 10 \cdot 10^{-6} K^{-1}$, the entrainment means Ud of aluminum, with a thermal expansion coefficient $\alpha(Ud) = 20 \cdot 10^{-6} K^{-1}$ and the scanning unit Ad of a synthetic material, with a thermal expansion coefficient $\alpha(Ad) = 35 \cdot 10^{-6} K^{-1}$. The scanning element AEd of the scanning unit Ad lies between the first fastening point PUd of the entrainment means Ud and the coupling point AKd of the scanning unit Ad, which is connected to the entrainment means Ud. A first spacing "a" is defined between the first fastening point PUd of the entrainment means Ud and the coupling point AKd of the scanning unit Ad. A second spacing "b" is defined between the coupling point AKd of the scanning unit Ad and the scanning point APd of the scanning element AEd. The first spacing "a" and the second spacing "b" are related such that they satisfy the condition $\alpha(Ud)\cdot a = \alpha(Ad)\cdot b$. Thus, thermal expansion caused by temperature changes, relative to the normal thermal condition, are accommodated despite the different thermal expansion coefficients of the scanning unit Ad, the entrainment means Ud and of the second object Bd. No relative displacements occur between the scanning point APd of the scanning unit Ad and the appertaining reference point BPd of the second object Bd. Zero point displacements of the measuring apparatus are eliminated, as are the corresponding measurement errors.

Figure 5:
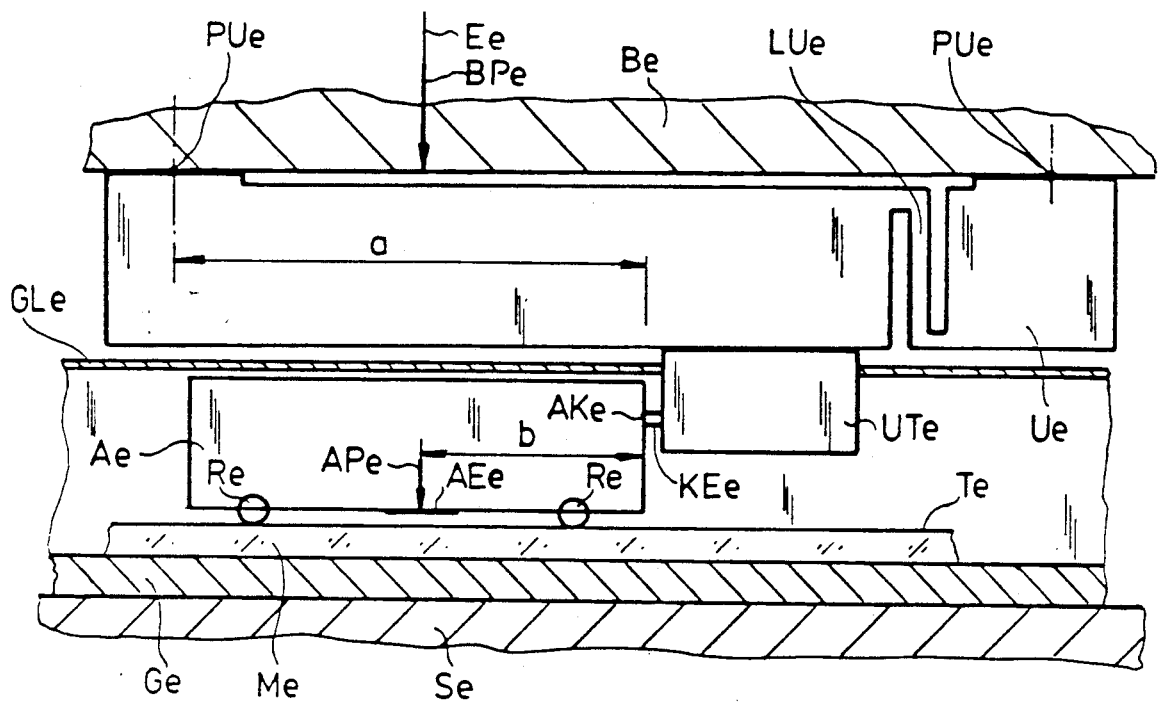
FIG. 5 is a schematic representation of a length or angle measuring apparatus which incorporates a fifth preferred embodiment of the present invention.

FIG. 5 illustrates yet another preferred embodiment which incorporates the length measuring apparatus of the present invention in an encapsulated arrangement. A carrier Ge, such as the casing of a scale Me, is fastened on a first object Se to be measured, such as the sliding carriage of a processing machine (not shown). The scale Me may be fastened in any arbitrary conventional manner, for examples by means of screws (not shown). The scale Me is mounted, by means of an adhesive layer (not shown), on an inner surface of the casing Ge. An entrainment means Ue is fastened on a second object Be to be measured, such as the bed of the processing machine. The first end of the entrainment means Ue is fastened at a first fastening point PUe and the second end is fastened at a second fastening point PUe. A scanning unit Ae is guided by means of rolls Re engaged with the scale Me and is further guided, in a manner not shown, by means of an auxiliary guide which includes second rolls engaged with the inner surfaces of the casing Ge. Preferably, the auxiliary guide is independent of the guidance of the objects to be measured Se and Be. The scanning unit Ae includes a scanning element AEe, which scans a graduation Te of the scale Me to measure the relative position of the two objects Se and Be. The lower part of the entrainment means Ue projects through an oblong slit GLe which is sealed by sealing lips of the casing Ge (not shown). The lower part of the entrainment means has a cross section similar to that of a double-edged sword. A coupling element KEe, which is rigid in the measuring direction X, is mounted on the lower part of entrainment means Ue. This arrangement provides articulate coupling of the scanning unit Ae to the entrainment means Ue at a coupling point AKe. The scanning unit Ae is biased to remain in constant contact with the coupling element KEe, at the coupling point AKe, by means of a spring (not shown). A meander-form length compensation element, formed as an integral component of the entrainment means Ue, is provided between the coupling point AKe of the scanning unit Ae and the second fastening point PUe of the entrainment means Ue. The meander-form length compensation element LUe of the entrainment means Ue provides a coupling for the second end of the entrainment means Ue which has a translatory degree of freedom in measuring direction X. The translatory degree of freedom accommodates thermal expansions caused by temperature changes relative to normal thermal conditions.

The scanning point APe (scanning place) of the scanning element AEe of the scanning unit Ae and the appertaining reference point BPe of the second object Be lie, under normal thermal conditions (for example 20° C.), in a plane Ee which is perpendicular to the measuring direction X. Again, in an exemplary embodiment, the second object Be may consist of gray cast iron, with a thermal expansion coefficient $\alpha(Be) = 10\cdot 10^{-6} K^{-1}$, the entrainment means Ue of aluminum, with a thermal expansion coefficient $\alpha(Be) = 21\cdot 10^{-6} K^{-1}$, and the scanning unit Ae of a synthetic material, with a thermal expansion coefficient $\alpha(Ae) = 35\cdot 10^{-6} K^{-1}$. The scanning element AEe of the scanning unit Ae lies between the first fastening point PUe of the entrainment means Ue and the coupling point AKe of the scanning unit Ae. A first spacing "a" is defined between the first fastening point PUe of the entrainment means Ue and the coupling +point AKe of the scanning unit Ae. A second spacing "b" is defined between the coupling point AKe of the scanning unit Ae and the scanning point APe of the scanning element AEe. The first spacing "a" and the second spacing "b" are related such that they satisfy the condition $\alpha(Ue)\cdot a = \alpha(Ae)\cdot b$. Therefore, despite temperature changes relative to the normal thermal condition, no relative displacements occur between the scanning point APe of the scanning unit Ae and the appertaining reference point BPe of the second object Be. Accordingly, zero point displacements are eliminated as are the corresponding errors in measurement which can arise.

Here, the scanning point (scanning place) of the scanning element of the scanning unit is defined as the midpoint (center) of the scanning element; for example, in a photoelectric scanning unit with a scanning graduation field, the scanning point of the scanning element is formed by the midpoint (surface center) of this scanning graduation field.

The present invention may be used both in incremental and in absolute position measuring devices such as measuring devices of the optical, photoelectric, magnetic, capacitive or inductive type.

The embodiments of the invention in which an exclusive property or privilege is claimed are defined as follows:

1. In a length or angle measuring apparatus for measuring the relative position of two objects, said measuring apparatus comprising a scale connected to a first object to be measured, said scale having a graduation and defining a measuring direction X; a scanning unit connected to a second object to be measured, said scanning unit having at least one scanning element for scanning said graduation of said scale at a scanning point; wherein the second object and the scanning unit have different thermal expansion coefficients, the improvement comprising:

fastening means for fastening said scanning unit to said second object at a fastening point, said fastening point lying on a line defined by the intersection of a plane perpendicular to the measuring direction X and a plane parallel to the measuring direction X, which line includes said scanning point of said scanning element of said scanning unit.

2. The measuring apparatus according to claim 1, wherein said fastening means comprises an entrainment means for connecting said scanning unit to said second object, said entrainment means and said scanning unit having different thermal expansion coefficients, wherein said entrainment means is fastened to said second object at said fastening point and said scanning unit is coupled by coupling means to the entrainment means at a coupling point and wherein said coupling point lies in said plane parallel to the measuring direction X.

3. The measuring apparatus according to claim 2 wherein said entrainment means is further fastened to said second object, at least on one end of said entrainment means, at a second entrainment means fastening point, and further comprises a length compensation element disposed between said fastening point and said second entrainment means fastening point.

4. The measuring apparatus according to claim 3 further comprising a fastening element at least on one end of said scanning unit for further fastening said scanning unit to said entrainment means at a second scanning unit fastening point; and a length compensation element disposed between the end of said scanning unit and said fastening element.

5. A measuring apparatus according to claim 4, wherein said length of compensation element disposed between said fastening point and said second entrainment means fastening point is formed as an integral component of said fastening element.

6. The measuring apparatus according to claim 3 further comprising an auxiliary guide which cooperates with said scale to guide said scanning unit independent of the guidance of said first and said second objects, and wherein the coupling means comprises a coupling element for coupling said scanning unit to said entrainment means at said coupling point, said coupling element being rigid in the measuring direction X, such that said scanning unit is articulately coupled to said entrainment means.

7. The measuring apparatus of claim 6 further comprising a carrier for carrying said scale and wherein said auxiliary guide further cooperates with said carrier to guide said scanning unit.

8. The measuring arrangement according to claim 3 further comprising a carrier for carrying said scale, an auxiliary guide which cooperates with the said carrier to guide said scanning unit independent of the guidance of said first and second objects; and wherein the coupling means comprises a coupling element for coupling said scanning unit to said entrainment means at said coupling point, said coupling element being rigid in the measuring direction X, such that said scanning unit is articulately coupled to said entrainment means.

9. The measuring apparatus according to claim 3 wherein said length compensation element is formed as an integral component of said entrainment means.

10. The measuring apparatus according to claim 2 further comprising a fastening element at least on one end of said scanning unit for further fastening said scanning unit to said entrainment means at a second scanning unit fastening point; and a length compensation element disposed between the end of said scanning unit and said fastening element.

11. A measuring apparatus according to claim 10, wherein said length compensation element is formed as an integral component of said fastening element.

12. The measuring apparatus according to claim 2 further comprising an auxiliary guide which cooperates with said scale to guide said scanning unit independent of the guidance of said first and said second objects; and wherein said coupling means comprises a coupling element for coupling said scanning unit to said entrainment means at said coupling point, said coupling element being rigid in the measuring direction X, such that said scanning unit is articulately coupled to said entrainment means.

13. The measuring apparatus of claim 12 further comprising a carrier for carrying said scale and wherein said auxiliary guide further cooperates with said carrier to guide said scanning unit.

14. The measuring arrangement according to claim 2 further comprising a carrier for carrying said scale, an auxiliary guide which cooperates with the said carrier to guide said scanning unit independent of the guidance of said first and second objects; and wherein the coupling means comprises a coupling element for coupling said scanning unit to said entrainment means at said coupling point, said coupling element being rigid in the measuring direction X, such that said scanning unit is articulately coupled to said entrainment means.

15. The measuring apparatus according to claim 1 further comprising a fastening element for further fastening said scanning unit, at least on one end, to said second object at a further fastening point; and a length compensation element disposed between said scanning unit and said fastening element.

16. A measuring apparatus according to claim 15, wherein said length compensation element is formed as an integral component of said fastening element.

17. A length or angle measuring apparatus for measuring the relative position of two objects, said measuring apparatus comprising a scale connected to a first object to be measured, said scale having a graduation and defining a measuring direction X; a scanning unit, having at least one scanning element, for scanning said graduation of said scale at a scanning point, said scanning unit connected to a second object to be measured by an entrainment means, wherein said second object, said entrainment means, and said scanning unit include different thermal expansion coefficients $\alpha(Bd, Be)$, $\alpha(Ud, Ue)$ and $\alpha(Ad, Ae)$, respectively, the improvement comprising:

first fastening means for connecting said entrainment means to said second object at a first fastening point and;

coupling means for coupling said scanning unit to said entrainment means at a coupling point, wherein said scanning element of said scanning unit lies between said fastening point and said coupling point along the measuring direction, a first spacing along the measuring direction "a" is defined between said fastening point and said coupling point; and a second spacing along the measuring direction, "b" is defined between said coupling point and said scanning point of said scanning element, and wherein said first spacing "a" and said second spacing "b" are related such that they satisfy the condition $\alpha(Ud, Ue)\cdot b$.

18. The measuring apparatus according to claim 17 wherein said first fastening point is disposed at a first end of said entrainment means and further comprising a second fastening means having a second entrainment means fastening point, said second fastening means disposed at the second end of said entrainment means and fastening said entrainment means fastening point; and a length compensation element associated with the second fastening means disposed between said coupling point and said second entrainment means fastening point.

19. The measuring apparatus according to claim 18, wherein said coupling point is disposed at a first end of said scanning unit and further comprising a scanning unit fastening element, for attaching the second end of said scanning unit to said entrainment means at a second scanning unit fastening point; and a scanning unit length compensation element disposed between the second end of said scanning unit and said fastening element.

20. A measuring apparatus according to claim 19, wherein at least one of said length compensation elements is formed as an integral component of said fastening element.

21. The measuring apparatus according to claim 18, further comprising an auxiliary guide which cooperates with said scale to guide said scanning unit independent of the guidance of said first and said second objects; and wherein the coupling means comprises a coupling element for coupling said scanning unit to said entrainment means at said coupling point, said coupling element being rigid in the measuring direction X, such that said scanning unit is articulately coupled to said entrainment means.

22. The measuring apparatus of claim 21 further comprising a carrier to carry said scale, wherein said auxiliary guide further cooperates with said carrier to guide said scanning unit independent of said first and said second objects.

23. The measuring apparatus according to claim 18 further comprising a carrier for carrying said scale; and an auxiliary guide which cooperates with said carrier to guide said scanning unit independent of the guidance of said first or said second objects; said coupling means comprising a coupling element, said coupling element being rigid in the measuring direction X, such that said scanning unit is articulately coupled to said entrainment means.

24. A measuring apparatus according to claim 18 wherein at least one of said length compensation elements is formed as an integral component of said fastening element.

25. The measuring apparatus according to claim 18 wherein said length compensation element is formed as an integral component of said entrainment means.

26. The measuring apparatus according to claim 17, wherein said coupling point is disposed at a first end of said scanning unit and further comprising a scanning unit fastening element, for attaching the second end of said scanning unit to said entrainment means at a second scanning unit fastening point; and a scanning unit length compensation element disposed between the second end of said scanning unit and said fastening element.

27. The measuring apparatus according to claim 17, further comprising an auxiliary guide which cooperates with said scale to guide said scanning unit independent of the guidance of said first and said second objects; and wherein the coupling means comprises a coupling element for coupling said scanning unit to said entrainment means at said coupling point, said coupling element being rigid in the measuring direction X, such that said scanning unit is articulately coupled to said entrainment means.

28. The measuring apparatus according to claim 17 further comprising a carrier for carrying said scale; and an auxiliary guide which cooperates with said carrier to guide said scanning unit independent of the guidance of said first or said second objects; and wherein the coupling means comprises a coupling element for coupling said scanning unit to said entrainment means at said coupling point, said coupling element being rigid in the measuring direction X, such that said scanning unit is articulately coupled to said entrainment means.

29. In a length or angle measuring apparatus for measuring the relative position of two objects, said measuring apparatus comprising a scale connected to a first object to be measured, said scale having a graduation and defining a measuring direction X; a scanning unit connected to a second object to be measured, said scanning unit having at least one scanning element for scanning said graduation of said scale at a scanning point, wherein the second object and the scanning unit having different thermal expansion coefficients, the improvement comprising:

fastening means for fastening said scanning unit to said second object at a fastening point, said fastening point lying in a plane parallel to the measuring direction X, which plane includes said scanning point of said scanning element of said scanning unit;

a fastening element at least on one end of said scanning unit for further fastening said scanning unit to an entrainment means at a second scanning unit fastening point; and a length compensation element disposed between the end of said scanning unit and said fastening element.

* * * * *